United States Patent [19]

Johnston et al.

[11] Patent Number: 4,954,039
[45] Date of Patent: Sep. 4, 1990

[54] UNIFRAME ROLLOFF DUMPSTER

[75] Inventors: William T. Johnston, Randolph; Leslie Smith, Jr., Beloit; David K. Barker, Alliance, all of Ohio

[73] Assignee: Trailstar Mfg. Corp., Alliance, Ohio

[21] Appl. No.: 263,532

[22] Filed: Oct. 27, 1988

[51] Int. Cl.[5] .............................................. B60P 1/08
[52] U.S. Cl. ............................. 414/500; 298/20 A; 298/22 AE; 296/184; 414/494; 414/483; 414/480
[58] Field of Search ............... 414/498, 499, 500, 482, 414/483, 473, 480, 491, 494, 538, 569; 298/20 A, 22 AE, 1 R, 38

[56] References Cited

U.S. PATENT DOCUMENTS

| | | |
|---|---|---|
| 3,003,818 | 10/1961 | Merchant . |
| 3,039,822 | 6/1962 | McManus .................. 298/22 AE X |
| 3,049,378 | 8/1962 | Nelson ........................ 414/500 X |
| 3,111,346 | 11/1963 | Harbers et al. . |
| 3,934,740 | 1/1976 | Rumell ....................... 414/494 X |
| 4,047,630 | 9/1977 | Young . |
| 4,273,382 | 6/1981 | Benson ...................... 296/184 X |
| 4,529,349 | 7/1985 | Lutz .......................... 414/494 X |
| 4,671,526 | 6/1987 | Booher ...................... 298/20 A X |

FOREIGN PATENT DOCUMENTS

| | | |
|---|---|---|
| 2319652 | 12/1973 | Fed. Rep. of Germany ...... 414/480 |
| 2002222 | 10/1969 | France .......................... 298/22 AE |
| 2495072 | 6/1982 | France . |
| 1542045 | 3/1979 | United Kingdom ............... 414/500 |

Primary Examiner—Frank E. Werner
Attorney, Agent, or Firm—Fay, Sharpe, Beall, Fagan, Minnich & McKee

[57] ABSTRACT

A dump trailer for transporting containers includes a movable frame that receives an associated container. A support plate operatively engages a fifth wheel of a tractor. Interposed between the support plate and the frame is a telescopic hoist assembly to pivot the frame relative to the support plate. A draft arm also extends between the support plate and frame to guide movement of the frame during the hoisting operation. Loading and unloading of the container relative to the tilted frame is controlled by a cylinder and cable assembly secured to the frame. The support plate and frame also include a series of flanges for locking the frame against lateral and longitudinal movement relative to the support plate.

1 Claim, 7 Drawing Sheets

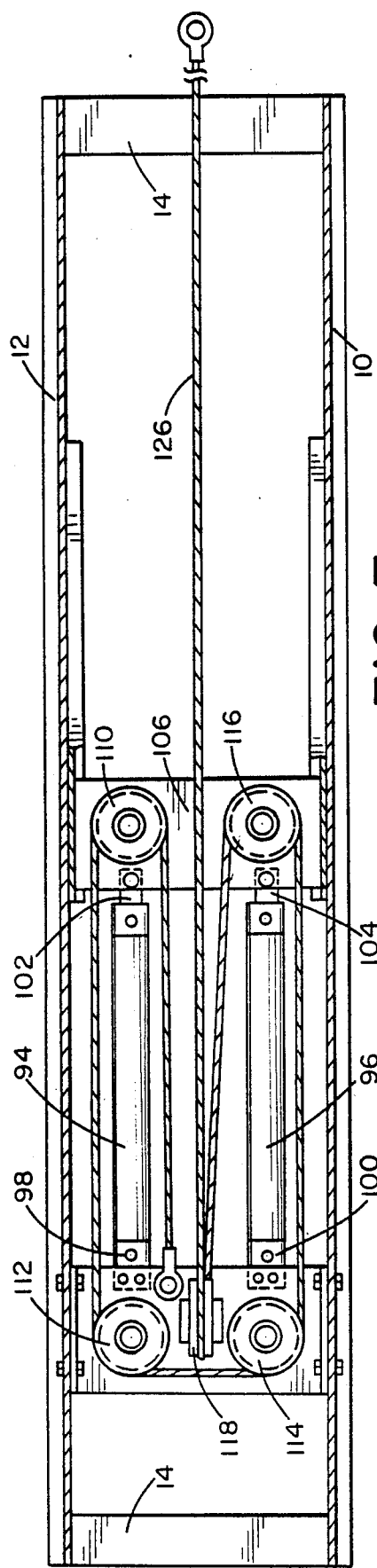
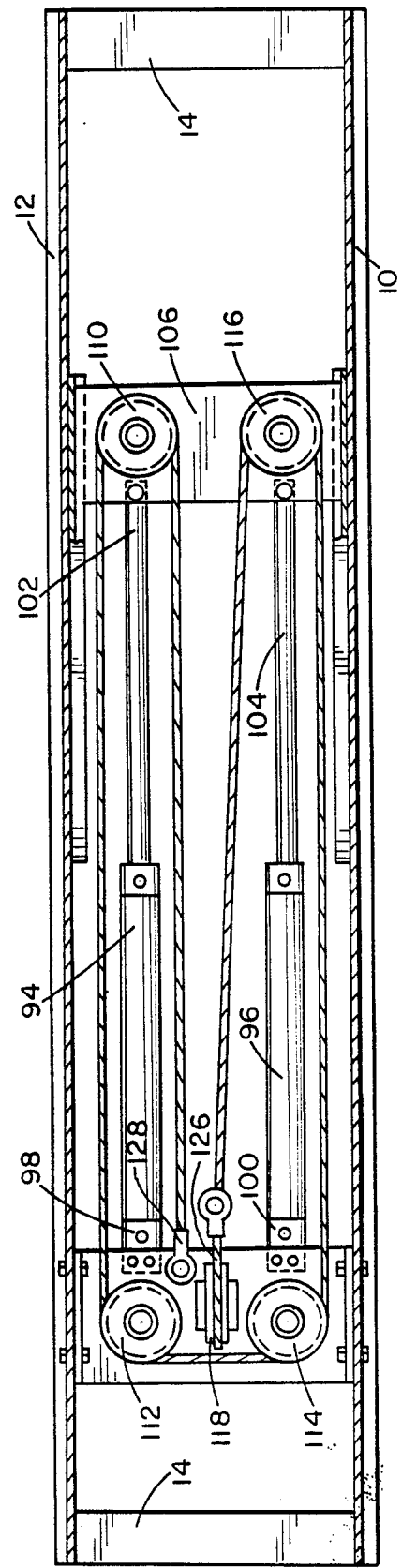
FIG. 7
FIG. 8

UNIFRAME ROLLOFF DUMPSTER

BACKGROUND OF THE INVENTION

This invention pertains to the art of container transport trailers and more particularly to rolloff dumpster trailers in which a frame is selectively raised relative to an associated tractor for releasing a container from the trailer.

The invention is particularly applicable to a container transport trailer having wheels disposed at one end and a second end of the trailer adapted for connection to a conventional tractor and will be described with particular reference thereto. However, it will be appreciated that the invention has broader applications and may be advantageously employed in other environments and applications.

A rolloff dumpster is a trailer that selectively transports a removable container or box. The container is typically removed from the trailer by raising a frame to a predetermined angle relative to the ground surface so that the container will slide off the frame due to gravity. In the past, a reeving hoist has been employed on the trailer and attached to the container to pull the container onto the frame.

Tractor trailer arrangements in wide use today employ two frames in the rolloff dumpster arrangement. A first frame is a heavy-duty, I-beam chassis that has wheels disposed at one end for transporting the trailer over the road and is secured to the fifth wheel of a tractor at its other end. The first frame maintains its substantially horizontal arrangement at all times, whether it is towed by a tractor or supported by jack stands at the front end of the trailer.

The second frame is selectively pivoted relative to the first frame. In a first or lowered position, the second frame is substantially horizontal and supported along its length by the first frame. In a second or raised position, the second frame remains secured to the first frame at one end and is lifted relative to the first frame at the other end. Double acting telescopic lift cylinders are disposed on the first frame and urge the second frame to pivot about the first end and dispose the second frame at a predetermined lift angle. Rollers are provided on either the second frame or the container, or both, to aid in sliding movement of the container off the second frame. A reeving cylinder winch assembly is then secured to one end of a new container to haul the container onto the second frame. Thereafter, the lift cylinders are retracted and the second frame brought into generally horizontal, mating arrangement with the first frame.

Requirements under various laws limit the size and weight of the trailer. As is apparent from the above discussion, prior arrangements have utilized two separate frames that unnecessarily add to the overall weight of the rolloff dumpster trailer. The materials necessary for manufacturing these trailers are also correspondingly expensive and lead to an overall, unnecessary complexity of construction.

Another problem associated with trailers of this type is the need to control movement of the container relative to the trailer during loading and unloading. Specifically, the container may move approximately 35 feet along the frame during either loading or unloading. It is obviously much safer to control the unloading movement of the container rather than permitting free rolling of the container. On the other hand, it is also necessary to provide a means for moving a container onto the frame. In the past, a variety of winch assemblies have been utilized which are unnecessarily cumbersome and extremely slow to use. A winch assembly is economically undesirable because of its problems with safety and speed. The cables will often break.

Still another concern is the ability of a modified trailer to withstand axial and lateral movement of components of the trailer. Although pivoting movement of the tractor relative to the trailer is provided at the fifth wheel to provide turning movement of the truck, any unnecessary lateral or axial shifting of the trailer components will be transferred to the container. This, in turn, imposes stresses on the container/trailer interconnection.

SUMMARY OF THE INVENTION

The present invention contemplates a new and improved trailer that overcomes all of the above referred to problems and others and provides a simple, economical rolloff dumpster trailer.

According to the subject invention, a trailer for transporting a container includes a movable frame adapted to receive an associated container. A support plate is secured to a fifth wheel of an associated tractor and a lift cylinder interposed between the frame and support plate. The lift cylinder selectively raises one end of the frame for loading or unloading an associated container. Means for locking the frame against both longitudinal and lateral movement relative to the support plate is provided in conjunction with a draft bar extending therebetween.

According to a more limited aspect of the invention, a power cylinder is provided on the frame and cooperates with a cable arrangement for moving an associated container approximately four times the distance of the stroke of the power cylinder.

A principal advantage of the invention is a rolloff dumpster trailer that is significantly reduced in weight.

Yet another advantage of the invention resides in the ability to limit lateral and longitudinal movement of the frame relative to the support plate.

Still another advantage of the invention resides in the substantial reduction in time necessary to load and unload a container onto the trailer in a controlled manner.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 7 is an enlarged plan view of the power cylinders and cable arrangement in a retracted position and adapted for moving the container relative to the frame; and, FIG. 8 is a plan view similar to FIG. 7 but illustrating the power cylinders and cable arrangement in an extended position.

DETAILED DESCRIPTION OF THE PREFERRED EMBODIMENT

Figure 1:
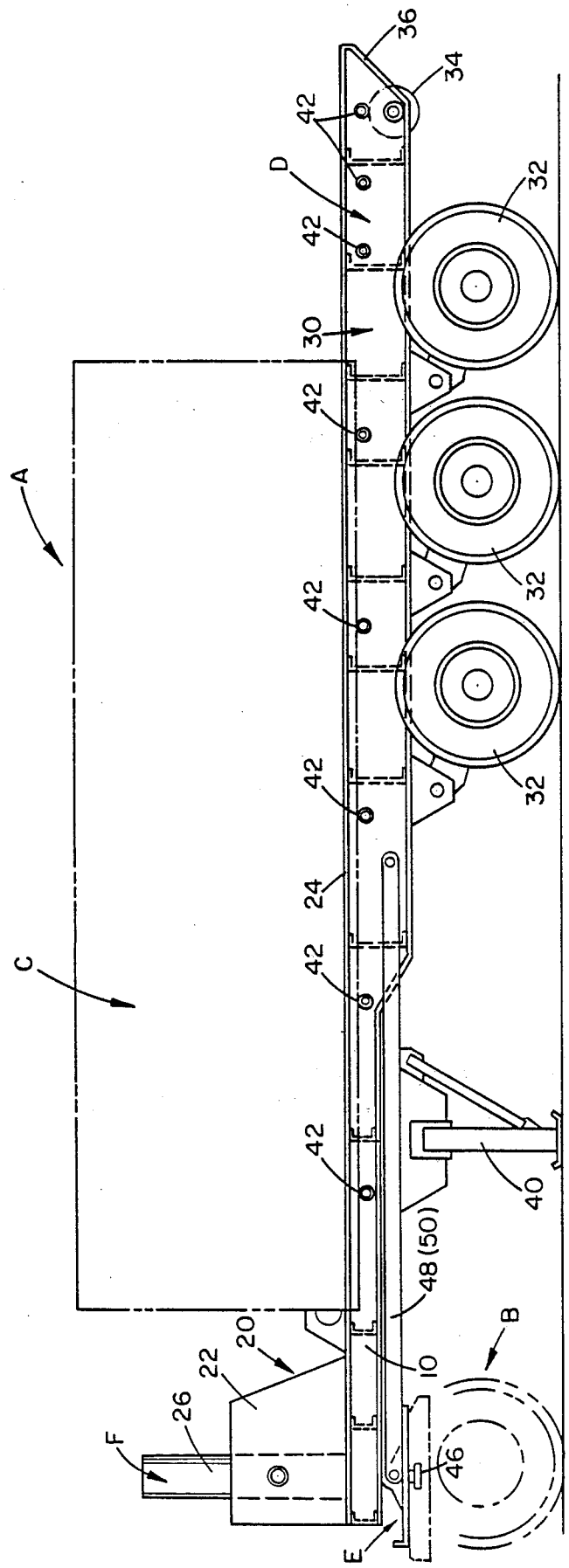
FIG. 1 is a side elevational view of the trailer with an associated container shown in phantom.
Figure 2:
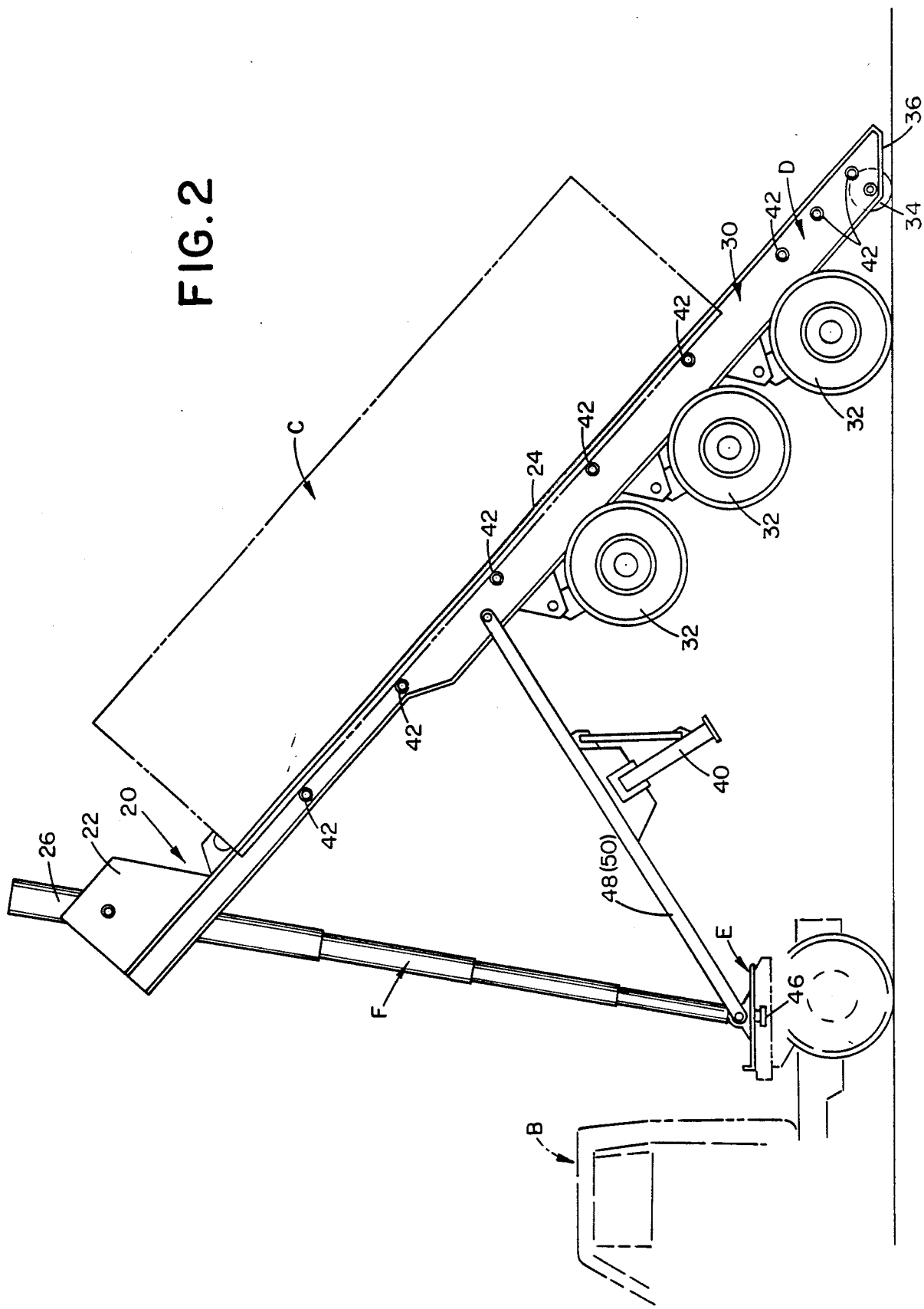
FIG. 2 is a side elevational view of the trailer frame and container in a raised position for loading/unloading of the container.
Figure 3:
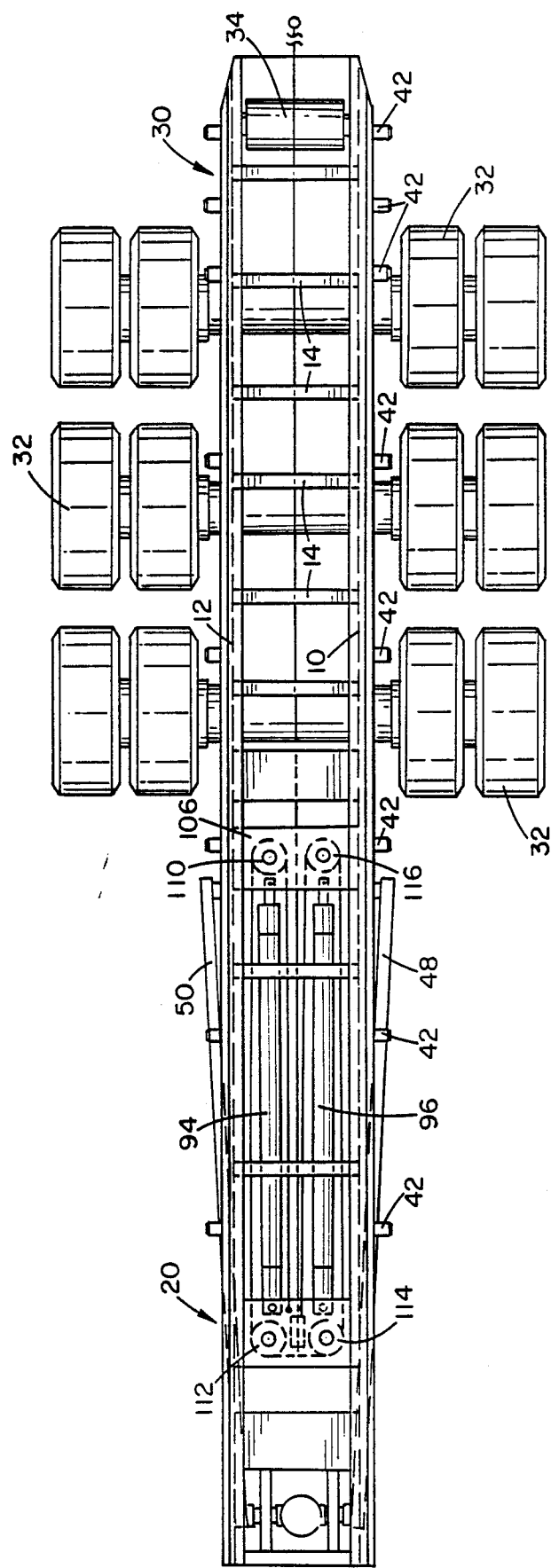
FIG. 3 is an overhead plan view of the frame according to the subject invention.

Referring now to the drawings wherein the showings are for purposes of illustrating the preferred embodiment of the invention only and not for purposes of limiting same, the FIGURES show a trailer A secured to a tractor truck B for transporting a container C. The trailer is a rolloff dumpster type trailer that includes an elongated frame D that operatively engages a support plate E through a means for tilting the frame such as telescopic cylinder F.

More particularly, the frame D includes first and second elongated sidewalls 10, 12 that extend generally parallel to one another. Bridging the gap between the first and second sidewalls are a series of spacer or reinforcing members 14. The sidewalls and spacer members define a generally rigid structure adapted to withstand heavy loads imposed by the container C.

A first or front end 20 of the frame is secured to the support plate E by means of the telescopic cylinder F. A framework 22 projects upwardly and outwardly from a generally planar surface 24 defined by the frame. The framework includes a pedestal 26 adapted to receive the telescopic cylinder therein. It also assists in maintaining the cylinder in generally perpendicular relation relative to the frame during a frame tilting or raising movement as will be described further below.

A second or rear end 30 of the frame includes a set of rear wheels 32 aiding in transport of the trailer over the ground surface. A support roller 34 is disposed on an outermost end of the frame. The support roller is adapted to engage the ground surface when the frame is tilted into an angular loading/unloading position as will become more apparent below. Additionally, the outermost end of the frame includes a tapered lower surface 36 adjacent the support roller that mates with the ground surface when the frame is in a tilted or raised position. Alternatively, it is within the scope of the invention to use an end which will be spaced from the ground and will use a dead lift system as is known in the art.

Also extending downwardly from the frame at an area disposed adjacent the first end is a jack stand assembly or dollies 40 that maintains the trailer in generally horizontal relation when disconnected from the tractor B. Since the jack stand assembly is of conventional structural arrangement, no further discussion is deemed necessary to a full and complete understanding of the subject invention. Also spaced along the first and second sidewalls 10, 12 are a series of rollers 42 on which a lower edge of a container C may rest. When the frame is raised to a load/unload position, the container slides or rolls along the rollers 42 in a controlled manner. Again, rollers of this type are conventional so that further discussion of the structural details is deemed unnecessary to a full and complete understanding of the invention.

The support plate E includes a downwardly extending lug 46 received in an associated groove of a fifth wheel of the tractor. As is well known in the art, the lug is locked into place to secure the trailer to the tractor. More specifically, the support plate is of substantially the same dimension as the fifth wheel, being substantially smaller than the frame D. Disposed along the periphery of the support plate and frame are first and second draft arms 48, 50. Each draft arm is pivotally secured to the support plate at one end and pivotally secured to the frame at an opposite end. Thus, securing the support plate to the tractor also secures the frame thereto due to the interconnection provided by the telescopic cylinder and draft arms.

Figure 4:
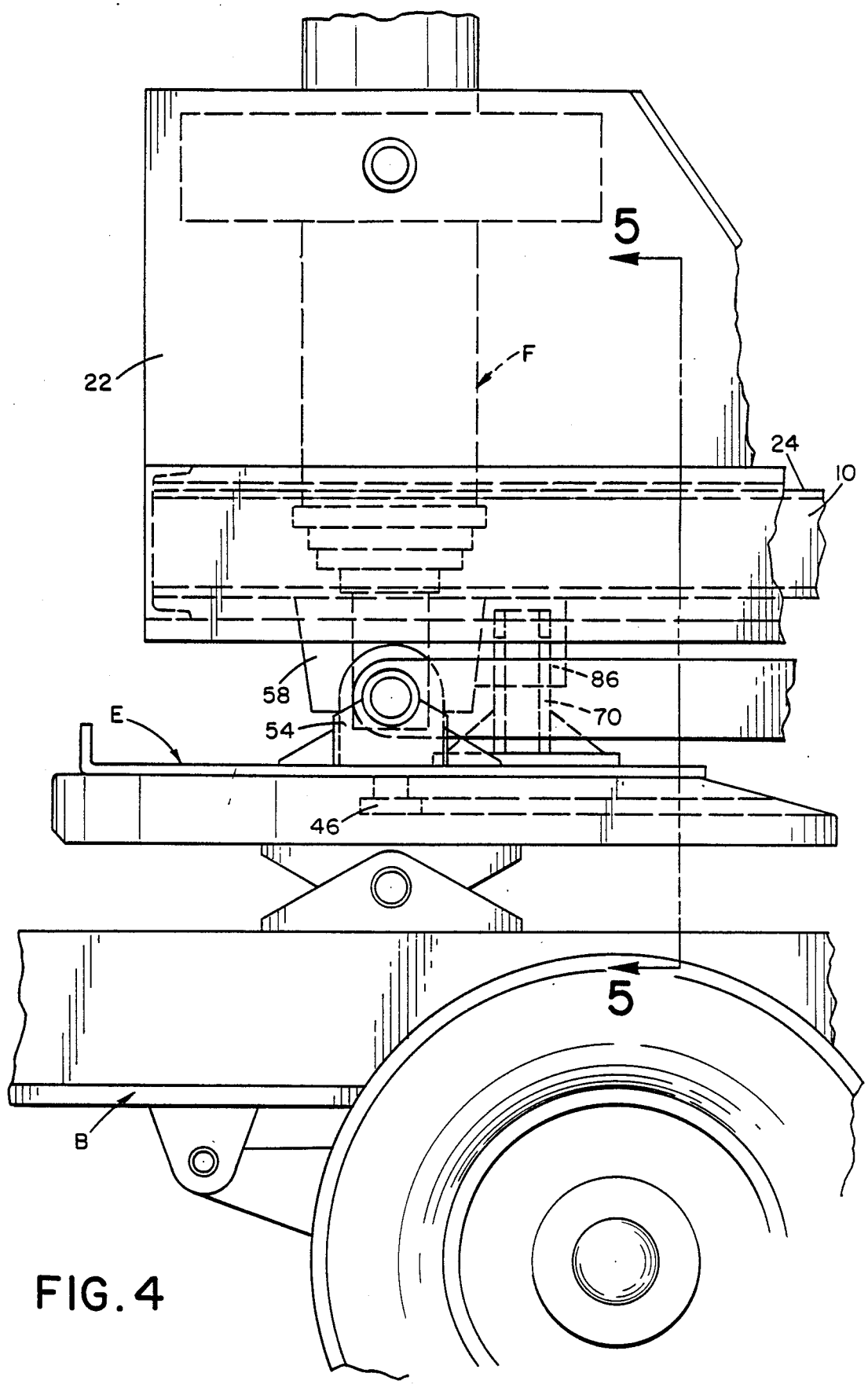
FIG. 4 is a side elevational view of the mating engagement between the support plate and frame.
Figure 5:
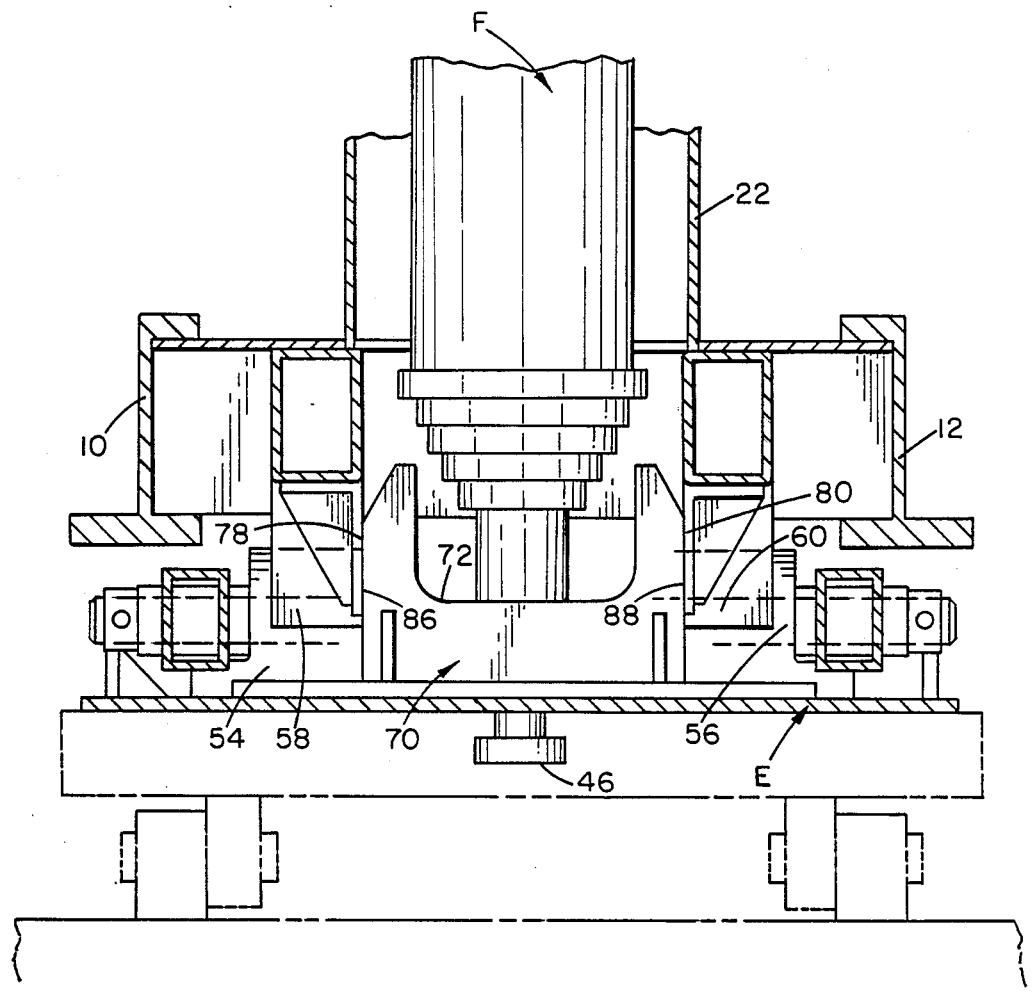
FIG. 5 is a rear elevational view of the support plate and frame in mating engagement taken on lines 5—5 of FIG. 4.
Figure 6:
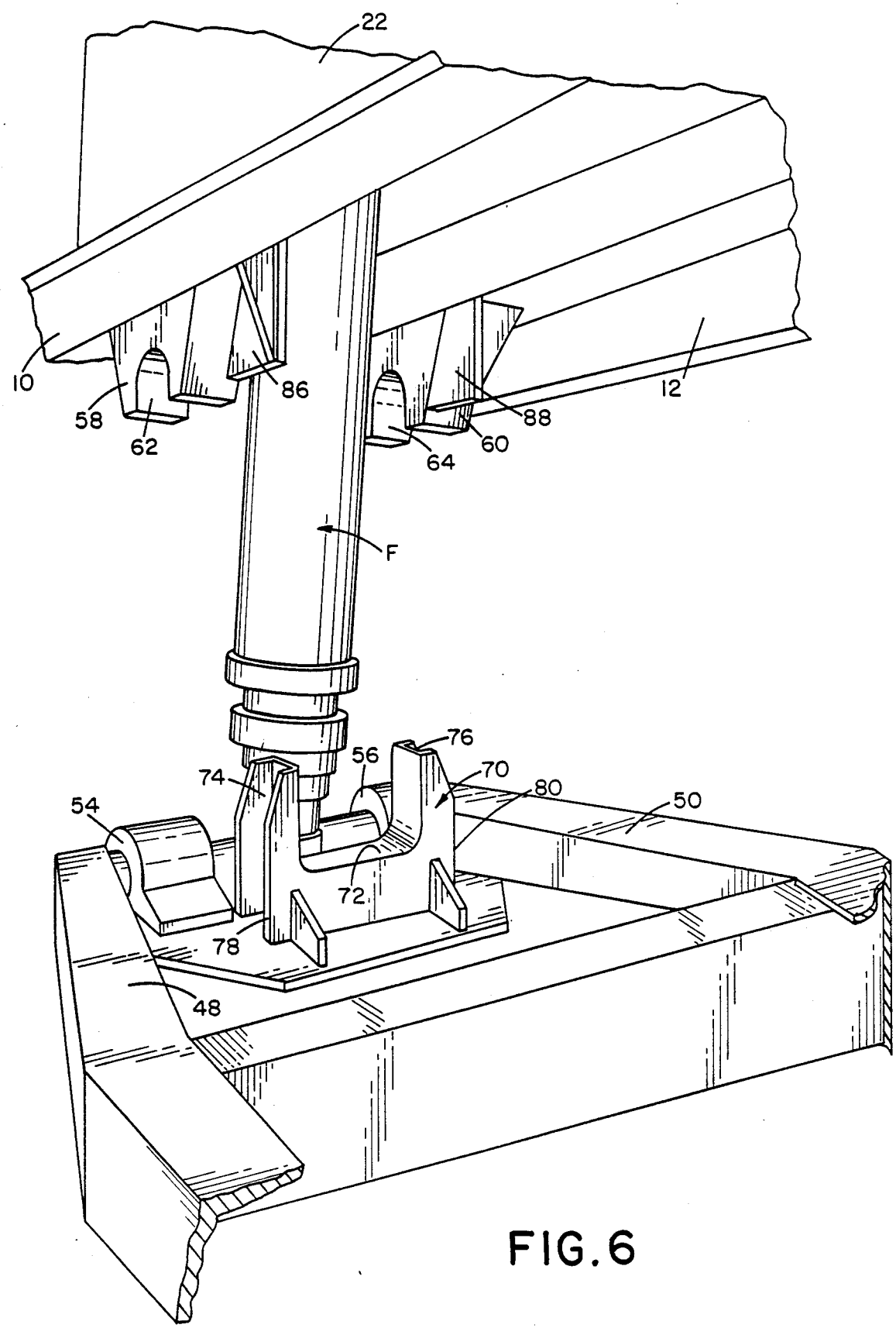
FIG. 6 is an enlarged perspective view of the support plate and front end of the trailer frame.

Although the draft arms do provide an intermediate connection between the support plate and frame, it has been deemed desirable to further limit both lateral and longitudinal movement of the frame relative to the support plate. More specifically, means for locking the frame against longitudinal movement relative to the support plate is provided by generally arcuate flanges 54, 56 that project upwardly from the support plate (FIGS. 4-6). The arcuate flanges cooperate with longitudinal locking members 58, 60 having arcuate recesses 62, 64 therein. When the frame is disposed in the generally horizontal position and seated on the support plate, the arcuate recesses of the locking members matingly engage the arcuate flanges of the support plate to limit movement therebetween along the longitudinal axis.

Means for locking the frame against lateral movement relative to the support plate is provided by an enlarged flange 70 having a U-shaped recess 72. Upstanding legs 74, 76 defined on either side of the recess have generally planar, outwardly facing surfaces 78, 80. Extending longitudinally from the locking members 58, 60 are first and second plates 86, 88 adapted for mating receipt with surfaces 78, 80, respectively. The planar surfaces of the flange 70 and plates 86, 88 limit any lateral movement of the frame relative to the support plate when the frame is disposed in a generally horizontal position.

Turning now to FIGS. 7 and 8, means for controlling movement of the container relative to the frame will be described in greater detail. First and second power cylinders 94, 96 are disposed in a parallel, tandem arrangement. Although parallel cylinders are shown, it is within the scope of the invention to employ a single cylinder adapted to the reeving cylinder assist. Preferably, the head ends 98, 100 of the cylinders 94, 96, respectively, are secured to the frame and the rod ends 102, 104, respectively, secured to a movable first carriage 106.

Mounted on the first carriage adjacent the rod end of the first cylinder 94 is a first pulley 110 while a second pulley 112 is received on the frame adjacent the head end of the first cylinder. Additionally, a third pulley 114 is received on the frame adjacent the head end of the second power cylinder while a fourth pulley 116 selectively rotates on carriage 106 adjacent the rod end of the second power cylinder. Lastly, a fifth pulley 118 is secured on the frame, preferably at a region interposed between the first and second cylinders.

The pulleys and cylinders cooperate with a cable 126 for controlling movement of the container relative to the frame. The cable has a first end 128 secured to the frame adjacent the fifth pulley. The cable extends from its fixed engagement with the frame along the length of the first cylinder, around the first pulley 110, along the length of the first cylinder again, and is received around the second pulley 112. The cable continues from the second pulley around the third pulley, along the length of the second power cylinder, around the fourth pulley 116, back along the length of the second power cylinder, and around the fifth pulley 118. The cable then extends to a second carriage (not shown) having latches that secure the container thereto. The cable and pulley arrangement defines a means for magnifying the output of the power cylinders. That is, the movement of the rod ends 102, 104 is magnified into greater longitudinal movement of the second carriage. According to the preferred embodiment, as the first and second cylinders extend and move the first carriage rightwardly as shown, the second end of the cable and second carriage moves leftwardly approximately twice the longitudinal distance of the first carriage. Similarly, leftward movement of the first carriage upon retraction of the rod ends of the cylinders permits the second carriage to advance rightwardly approximately twice this dimension.

In operation, a container C is secured to the second carriage and rests on the planar surface 24 of the frame. The container may be conveniently transported by securing the trailer to a conventional tractor. Once the predetermined destination has been reached, the first end 20 of the frame is raised by the telescopic cylinder and the second end pivots toward the ground surface. During either the tilting movement, or once the frame has reached its peak, the extended cylinders 94, 96 are retracted so that the container moves in a controlled manner relative to the frame and is deposited on the ground surface. The rollers 42 facilitate this sliding movement.

Either the same container or a new container is then secured to the second carriage disposed adjacent the second end of the frame. The power cylinders are then extended so as to move the second carriage and attached container toward the first end of the frame. Once loaded onto the frame, or simultaneously therewith, the telescopic cylinder is retracted and the frame brought into mating engagement with the support plate E. The longitudinal and lateral locking occurs between the support plate and frame once the frame reaches its retracted, horizontal position and the trailer is ready for transport by the tractor.

The invention has been described with reference to the preferred embodiment. Obviously modifications and alterations will occur to others upon a reading and understanding of this specification. It is intended to include all such modifications and alterations insofar as they come within the scope of the appended claims or the equivalents thereof.

What is claimed is:

1. A trailer adapted for attachment to an associated tractor for transporting containers, the trailer comprising:

an elongated, rigid frame having opposed first and second ends;

a jack stand assembly disposed adjacent the frame first end for maintaining the frame generally horizontal when the trailer is disconnected from the associated tractor;

wheels disposed adjacent the frame second end for transporting the trailer;

a support plate adapted for selective engagement with a fifth wheel of an associated tractor, the support plate being substantially smaller than the frame, and securing the frame to the tractor without an intermediary frame element;

first and second draft arms each pivotally secured at opposite ends to the support plate and frame, respectively;

means for selectively raising the frame first end and pivoting the frame about the wheels, the raising manes adapted to facilitate loading and unloading of an associated container on and off the frame, a first end of the raising means being secured to the support plate and a second end of the raising means being secured to the frame first end;

a double acting power cylinder and cable arrangement received on the frame for moving the associated container relative to the frame at least twice the distance of the stroke of the power cylinder, one end of the cable being secured to the frame, extending around a first pulley disposed at one end of the power cylinder, around a second pulley disposed at the opposite end of the power cylinder, around a third pulley disposed at the one end of the power cylinder, around a fourth pulley at the other end of the power cylinder, and adapted for connection with the associated container; and means for locking the frame against longitudinal and lateral movement relative to the support plate.

* * * * *